United States Patent [19]

Giles, Jr. et al.

[11] Patent Number: 5,013,799
[45] Date of Patent: May 7, 1991

[54] POLYETHERIMIDE-POLYAMIDE BLENDS

[76] Inventors: Harold F. Giles, Jr., Wilshire Dr., Cheshire, Mass. 01225; Dwain M. White, 2334 St. Joseph Dr., Schenectady, N.Y. 12309

[21] Appl. No.: 248,326

[22] Filed: Sep. 21, 1988

Related U.S. Application Data

[63] Continuation of Ser. No. 53,540, May 26, 1987, abandoned, which is a continuation of Ser. No. 883,844, Jul. 9, 1986, abandoned, which is a continuation of Ser. No. 574,464, Jan. 27, 1984, abandoned, which is a continuation-in-part of Ser. No. 359,256, Mar. 18, 1982, abandoned.

[51] Int. Cl.$^5$ .............................................. C08L 77/00
[52] U.S. Cl. .................................. 525/432; 525/431; 525/436; 525/928
[58] Field of Search ............... 525/432, 436, 928, 431

[56] References Cited

U.S. PATENT DOCUMENTS

| | | | |
|---|---|---|---|
| 2,071,250 | 2/1937 | Carothers | 260/106 |
| 2,071,251 | 2/1937 | Carothers | 18/54 |
| 2,130,523 | 9/1938 | Carothers | 260/124 |
| 2,130,948 | 9/1938 | Carothers | 18/54 |
| 2,241,322 | 5/1941 | Hanford | 260/2 |
| 2,312,966 | 3/1943 | Hanford | 260/78 |
| 2,512,606 | 6/1950 | Bolton et al. | 260/78 |
| 3,393,210 | 7/1968 | Speck | 260/371 |
| 3,416,994 | 12/1968 | Chalmers et al. | 161/227 |
| 3,592,952 | 7/1971 | Fang | 260/857 |
| 3,838,097 | 9/1974 | Wirth | 260/49 |
| 3,847,867 | 11/1974 | Heath et al. | 260/47 CP |
| 3,849,869 | 11/1974 | Williams | 260/47 CE |
| 3,850,885 | 11/1974 | Takekoski et al. | 260/47 CE |
| 3,852,242 | 12/1974 | White | 260/47 CZ |
| 3,855,178 | 12/1974 | White et al. | 260/47.7 S |
| 4,141,927 | 2/1979 | White et al. | 260/857 |
| 4,258,155 | 3/1981 | Holub et al. | 525/431 |
| 4,332,929 | 6/1982 | Holub et al. | 528/185 |
| 4,340,697 | 7/1982 | Aya et al. | 525/420 |

FOREIGN PATENT DOCUMENTS

| | | |
|---|---|---|
| 0104659 | 4/1984 | European Pat. Off. |
| 379592 | 12/1966 | U.S.S.R. |
| 2570010 | 11/1969 | U.S.S.R. |
| 2039931 | 3/1980 | United Kingdom |

OTHER PUBLICATIONS

Koton MM and Florinski FA (1968) *Zh. Org. Khin.* 4(5):744.

*Primary Examiner*—Ana L. Carrillo

[57] ABSTRACT

Disclosed are blends comprising from about 40 to 70 wt. % of a polyetherimide and the remainder one or more polyamides. The blends generally have a tensile strength which is greater than the tensile strength of polyetherimide-polyamide blends which do not contain from about 40 to 70% polyetherimide, while still retaining a good combination of other physical properties such as heat distortion characteristics and impact strength. In addition, the blends of the invention may have a flexural strength which is greater than that of other polyetherimide-polyamide blends which do not contain from about 40 to 70% polyetherimide.

6 Claims, 5 Drawing Sheets

POLYETHERIMIDE-POLYAMIDE BLENDS

This is a continuation of application Ser. No. 053,540, filed May 26, 1987, now abandoned, which is a continuation of Ser. No. 883,844, filed July 9, 1986, now abandoned, which is a continuation of application Ser. No. 574,464, filed Jan. 27, 1984, now abandoned, which is a continuation-in-part of application Ser. No. 359,256, filed Mar. 18, 1982, now abandoned.

This invention relates to a particular class of polyetherimide-polyamide blends where the blend contains from 40 to 70 wt. % polyetherimide. Among other things, such blends have a higher tensile strength than those associated with polyethermide-polyamides blends containing less than 40% polyethermide and some blends containing more than 70% polyethermide.

The blends of the invention include a polyetherimide of the formula:

where a represents a whole number in excess of 1, e.g., 10 to 10,000 or more, the group is selected from:

R' being hydrogen, lower alkyl or lower alkoxy, preferably the polyetherimide includes the latter group where R' is hydrogen such that the polyetherimide is of the formula:

and the divalent bonds of the —O—Z—O— radical are in the 3,3'; 3,4'; 4,3' or the 4,4' position; and Z is a member of the class consisting of (1)

and (2) divalent organic radicals of the general formula:

where X is a member selected from the class consisting of divalent radicals of the formulas, where q is 0 or 1, y is a whole number from 1 to 5, and R is a divalent organic radical selected from the class consisting of (1) aromatic hydrocarbon radicals having from 6-20 carbon atoms and halogenated derivatives thereof, (2) alkylene radicals and cycloalkylene radicals having from 2-20 carbon atoms, $C_{(2-8)}$ alkylene terminated polydiorganosiloxane, and (3) divalent radicals included by the formula where Q is a member selected from the class consisting of where x is a whole number from 1 to 5 inclusive. Particularly preferred polyetherimides for the purposes of the present invention include those where and Z respectively are:

and R is selected from:

The polyetherimides where R is metaphenylene are most preferred.

As mentioned previously, the blends of the invention also include a polyamide. Polyamides are well known in the art and the term embraces those semi-crystalline and amorphous resins having a molecular weight of at least 5000 commonly referred to as nylons. Polyamides generally have repeating structural units represented by the general formula;

wherein $R_2$, $R_3$, and $R_4$, which may be the same of different, each represents an alkylene group having from 4 to 11 carbon atoms, and n is an integer of 30 to 500 or more. Suitable examples of alkylene groups containing 4 to 11 carbon atoms for $R_2$, $R_3$, and $R_4$ include a tetramethylene group, a pentamethylene group, a hexamethylene group, a heptamethylene group, an octamethylene group, a nonamethylene group, decamethylene group, an undecamethylene group, and the like.

Specifically, the following polyamides may be incorporated in the blends of the invention:
polyhexamethylene adipamide (nylon 6:6)
polypyrrolidone (nylon 4)
polycaprolactam (nylon 6)
polyheptolactam (nylon 7)
polycapryllactam (nylon 8)
polynonanolactam (nylon 9)
polyundecanolactam (nylon 11)
polydodecanolactam (nylon 12)
polyhexamethylene azelaiamide (nylon 6:9)
polyhexamethylene sebacamide (nylon 6:10)
polyhexamethylene isophthalamide (nylon 6:ip)
polymetaxylylene adipamide (nylon MXD:6)
polyamide of hexamethylenediamine and n-dodecanedioic acid (nylon 6:12)
polyamide of dodecamethylenediamine and n-dodecanedioic acid (nylon 12:12)

Nylon copolymers may also be used as the polyamide component of the blends of this invention. For example, suitable copolymers include the following:
hexamethylene adipamide/caprolactam (nylon 6:6/6)
hexamethylene adipamide/hexamethylene-isophthalamide (nylon 6:6/6ip)
hexamethylene adipamide/hexamethylene-terephthalamide (nylon 6:6/6T)
trimethylhexamethylene oxamide/hexamethylene oxamide (nylon trimethyl-6:2/6:2)
hexamethylene adipamide/hexamethylene-azelaiamide (nylon 6:6/6:9)
hexamethylene adipamide/hexamethylene-azelaiamide/ caprolactam (nylon 6:6/6:9/6)

Also useful is nylon 6:3 produced by Dynamit Nobel. This polyamide is the product of the dimethyl ester of terephthalic acid and a mixture of isomeric trimethyl hexamethylenediamine. Preferred nylons for the blends of the invention include 6,6/6; 11, 12, 6/3 and 6/12.

In addition, specific polyamides are described in U.S. Pat. Nos. 2,071,250; 2,071,251; 2,130,523; 2,130,948; 2,241,322; 2,312,966; 2,512,606 and 3,393,210.

The polyetherimides can be obtained by any of the methods well known to those skilled in the art including the reaction of any aromatic bis(ether anhydrides) of the formula where Z is as defined hereinbefore with an organic diamine of the formula where R is as defined hereinbefore.

Aromatic bis(ether anyhdride)s of the above formula include, for example, 2,2-bis[4-(2,3-dicarboxyphenoxy)-phenyl]-propane-dianhydride; 4,4'-bis(2, 3-dicarboxy-phenoxy)diphenyl ether dianhydride; 1,3-bis(2, 3-dicarboxyphenoxy)benzene dianhydride; 4,4'-bis(2,3-dicarboxyphenoxy)diphenyl sulfide dianhydride; 1,4-bis(2, 3-dicarboxyphenoxy)benzene dianhydride; 4,4'-bis(2,3-dicarboxyphenoxy)benzophenone dianhydride; 4,4'-bis (2,3-dicarboxyphenoxy)diphenyl sulfone dianhydride; 2,2-bis[4-(3,4-dicarboxyphenoxy)phenyl]propane dianhydride; 4,4'-bis(3,4-dicarboxyphenoxy)diphenyl ether dianhydride; 4,4'-bis(3,4-dicarboxyphenoxy)diphenyl sulfide dianhydride; 1,3-bis(3,4-dicarboxyphenoxy)benzene dianhydride; 1,4-bis(3,4-dicarboxyphenoxy)benzene dianhydride; 4,4'-bis(3,4-dicarboxyphenoxy)benzophenone dianhydride; 4-(2,3-dicarboxyphenoxy)-4'(3,4-dicarboxyphenoxy)diphenyl -2,2-propane dianhydride; etc., and mixtures of such dianhydrides.

In addition, aromatic bis(ether anhydride)s also included by the above formula are shown by Koton, M. M.; Florinski, F. S.; Bessonov, M. I.; Rudakov, A. P. (Institute of Heteroorganic compounds, Academy of Sciences, U.S.S.R.), U.S.S.R. 257,010, Nov. 11, 1969, Appl. May 3, 1967. In addition, dianhydrides are shown by M. M. Koton, F. S. Florinski, Zh Org. Khin, 4(5), 774 (1968).

Organic diamines of the above formula include, for example, m phenylenediamine, p-phenylenediamine, 4,4'-diaminodiphenylpropane, 4,4'-diaminodiphenylmethane, benzidine, 4,4'-diaminodiphenyl sulfide, 4,4'-diaminodiphenyl sulfone, 4,4'-diaminodiphenyl ether, 1,5-diaminonaphthalene, 3,3'-diaminodiphenyl ether, 1,5-diaminonaphthalene, 3,3'-dimethylbenzidine, 3,3'-dimethoxybenzidine, 2,4-bisβamino-t-butyl)toluene, bis(p-β-amino-t-butylphenyl)ether, bis(pβ-methyl-o-aminopentyl)benzene, 1,3-diamino-4-isopropylbenzene, 1,2-bis(3-aminopropoxy)ethane, m-xylylenediamine, p-xylylenediamine, 2,4-diaminotoluene, 2,6-diaminotoluene, bis(4-aminocyclohexyl)methane, 3-methylheptamethylenediamine, 4,4-dimethylheptamethylenediamine, 2,11-dodecanediamine, 2,2-dimethylopropylenediamine, octamethylenediamine, 3-methoxyhexamethylenediamine, 2,5-dimethylhexamethylenediamine, 2,5-dimethylheptamethylenediamine, 3-methylheptamethylenediamine, 5-methylnonamethylenediamine, 1,4-cyclohexanediamine, 1,12-octadecanediamine, bis(3-aminopropyl)sulfide, N-methyl-bis (3-aminopropyl)amine, hexamethylenediamine, heptamethylenediamine, nonamethylenediamine, decamethylenediamine, bis(3-aminopropyl) tetramethyldisiloxane, bis(4-aminobutyl) tetramethyldisiloxane, and the like.

In general, the reactions can be advantageously carried out employing well-known solvents, e.g., o-dichlorobenzene, m-cresol/dianhydrides and the diamines, at temperatures of from about 100° to about 250° C. Alternatively, the polyetherimides can be prepared by melt polymerization of any of the above dianhydrides with any of the above diamine compounds while heating the mixture of the ingredients at elevated temperatures with concurrent intermixing. Generally, melt polymerization temperatures between about 200° to 400° C. and preferably 230° to 300° C. can be employed. The conditions of the reaction and the proportions of ingredients can be varied widely depending on the desired molecular weight, intrinsic viscosity, and solvent resistance. In general, equimolar amounts of diamine and dianhydride are employed for high molecular weight polyetherimides, however, in certain instances, a slight molar excess (about 1 to 5 mol percent) of diamine can be employed resulting in the production of polyetherimides having terminal amine groups. Generally, useful polyetherimides have an intrinsic viscosity greater than 0.2 deciliters per gram, preferably 0.35 to 0.60, or 0.7 deciliters per gram or even higher when measured in m-cresol at 25° C.

Included among the many methods of making the polyetherimides are those disclosed in Heath et al U.S. Pat. No. 3,847,867, Williams U.S. Pat. No. 3,847,869, Takekoshi et al, U.S. Pat. No. 3,850,885, White U.S. Pat. No. 3,852,242 and 3,855,178, etc. These disclosures are incorporated herein in their entirety by reference for the purpose of teaching, by way of illustration, general and specific methods for preparing polyetherimides suitable for the blends of this invention.

Polyamides may be obtained by polymerizing a monoaminomonocarboxylic acid or an internal lactam thereof having at least two carbon atoms between the amino and carboxylic acid groups; or by polymerizing substantially equimolar proportions of a diamine which contains at least two carbon atoms between the amino groups and a dicarboxylic acid; or by polymerizing a monoaminocarboxylic acid or an internal lactam thereof as defined above together with substantially equimolecular proportions of a diamine and a dicarboxylic acid. The dicarboxylic acid may be used in the form of a functional derivative thereof, for example, an ester.

The term "substantially equimolecular proportions" (of the diamine and of the dicarboxylic acid) is used to comprehend both strict equimolecular proportions and the slight departures therefrom which are involved in conventional techniques for stabilizing the viscosity of the resultant polyamides.

As examples of the monoaminomonocarboxylic acids or lactams thereof, there may be mentioned those compounds containing from 2 to 16 carbon atoms between the amino and carboxylic acid groups, the carbon atoms forming a ring with the —O—NH— group in the case of a lactam. As particular examples of aminocarboxylic acids and lactams there may be mentioned ε-aminocaproic acid, butyrolactam, pivalolactam, caprolactam, capryllactam, enantholactam, undecanolactam, dodecanolactam and 3- and 4-amino benzoic acids.

Examples of suitable diamines are diamines of the general formula $H_2N(CH_2)_nNH_2$ wherein n is an integer of from 2 to 16, such as trimethylenediamine, tetramethylenediamine, pentamethylenediamine, octamethylenediamine, decamethylenediamine, dodecamethylenediamine, hexadecamethylenediamine, and especially hexamethylenediamine. C-alkylated diamines, e.g., 2,2-dimethylpentamethylenediamine and 2,2,4- and 2,4,4-trimethylhexamethylenediamine are further examples. Other diamines which may be mentioned as examples are aromatic diamines, e.g., p-phenylenediamine, 4,4'-diaminodiphenyl sulfone, 4,4'-diaminodiphenyl ether and 4,4'-diaminodiphenyl sulfone, 4,4'-diaminodiphenyl ether and 4,4'-diaminodiphenylmethane; and cycloaliphatic diamines, for example, diaminodicyclohexylmethane.

The dicarboxylic acids may be aromatic, for example, isophthalic and terephthalic acids. Preferred dicarboxylic acids are of the formula HOOC—Y—COOH wherein Y represents a divalent aliphatic radical containing at least two carbon atoms, and examples of such acids are sebacic acid, octadecanedioic acid, suberic acid, azelaic acid, undecanedioic acid, glutaric acid, pimelic acid, and especially adipic acid. Oxalic acid is also a preferred acid.

As was mentioned previously, the blends of the present invention comprise from about 40 to 70 wt. % preferably from 40 to 60 wt. % of a polyetherimide and the remainder one or more polyamides. Such blends generally have a tensile strength which is greater than the tensile strength of polyetherimide-polyamide blends which do not contain from 40 to 70% polyetherimide, while still retaining a good combination of other physical properties such as heat distortion characteristics and impact strength. The dramatically improved tensile strength of the claimed compositions over those outside the ranges is clearly established by the experimental results portrayed in FIG. 5. In addition, the blends of the invention may have a flexural strength which is greater than that of other polyetherimide-polyamide blends outside the scope of the invention. Consequently, by controlling the proportions of the polyetherimide and polyamide relative to each other within the above range, it was surprisingly found that blends having properties which are improved over those of blends outside the range as well as over the polyetherimide or polyamide components alone can be achieved. Thus, the blends of the invention provide materials which have certain properties approaching those of the polyetherimide component alone while containing a significant proportion of the generally presently less expensive polyamide relative to the polyetherimide. Furthermore, blends within the composition range of the present invention have an appearance which suggests that the blends are of one phase and therefore compatible.

The unique characteristics of the blends of the present invention are illustrated in the drawings in which.

It is contemplated that the polyetherimide-polyamide blends of the present invention may also include other additive materials such as fillers, stabilizers, plasticizers, flexibilizers, surfactant agents, pigments, dyes, reinforcements, flame retardants and diluents in conventional amounts. It is also contemplated that the blends of the invention may include two or more polyetherimides with one or more polyamides or two or more polyamides in combination with one or more polyetherimides.

Methods for forming polyetherimide-polyamide blends may vary considerably. Prior art blending techniques are generally satisfactory. A preferred method comprises blending the polymers and additives such as reinforcements in powder, granular or filamentous form, extruding the blend, and chopping the extrudate into pellets suitable for molding by means conventionally used to mold normally solid thermoplastic compositions.

The particular polyetherimide-polyamide blends of the present invention have application in a wide variety of physical shapes and forms, including the use as films, molding compounds, coatings, etc. When used as films or when made into molded products, these blends, including laminated products prepared therefrom, not only possess good physical properties at room temperature but they retain their strength and excellent response to workloading at elevated temperatures for long periods of time. Films formed from the blends of this invention may be used in application where films have been used previously. Thus, the blends of the present invention can be used in automobile and aviation applications for decorative and protective purposes, and as high temperature electrical insulation for motor slot liners, transformers, dielectric capacitors, cable and coil wrappings (form wound coil insulation for motors), and for containers and container linings. The blends can also be used in laminated structures where films or solutions of the blend are applied to various heatresistant or other type of materials such as asbestos, mica, glass fiber and the like, the sheets superimposed one upon the other, and thereafter subjecting the sheets to elevated temperatures and pressures to effect flow and cure of the resinous binder to yield cohesive laminated structures. Films made from the subject polyetherimidepolyamide blends can also serve in printed circuit applications.

Alternatively, solutions of the blends herein described can be coated on electrical conductors such as copper, aluminum, and the like and thereafter the coated conductor can be heated at elevated temperatures to remove the solvent and to form a continuous coating of the resinous composition thereon, If desired, an additional overcoat may be applied to such insulated conductors including the use of polymeric coatings, such as polyamides, polyesters, silicones, polyvinylformal resins, epoxy resins, polyimides, polytetrafluorethylene, etc. The use of the blends of the present invention as overcoats on other types of insulation is not precluded.

Other applications which are contemplated for these blends include their use as binders for asbestos fibers, carbon fibers, and other fibrous materials in making brake linings. The unexpected and distinct flexural strength revealed in FIG. 3 make the present compositions particularly desirable for applications in requiring rigidity and durability, automotive parts being a good example. In addition, molding compositions and molded articles may be formed from the polymeric blends of the invention such as by incorporating such fillers as asbestos, glass fibers, talc, quartz, powder, finely divided carbon, silica, and the like into the blends prior to molding. Shaped articles may be formed under heat, or under heat and pressure, in accordance with practices well-known in the art.

The following examples illustrate specific polyetherimide-polyamide blends in accordance with the present invention. It should be understood that the examples are given for the purpose of illustration and do not limit the invention. In the examples, all parts and percentages are by weight unless otherwise specified.

EXAMPLE I

A series of polyetherimide-nylon 6:6 blends, some according to the invention and some outside the invention, were prepared, the blends molded into test specimens and the specimens tested for various physical properties.

The polyetherimide of the blends was prepared from the reaction product of essentially equimolar amounts of 2,2-bis[4-(3,4-dicarboxy phenoxy)phenyl] propane dianhydride and m-phenylene diamine produced at elevated temperature of about 250° to about 300° C. and under a nitrogen atmosphere. The polymer was extruded at about 300° C. to form a strand and mechanically chopped into pellets. A test specimen of the polyetherimide was injection molded from the pellets at a temperature of about 685°–700° F. The physical properties of the polyetherimide are set forth in the first line of the following Table I.

The polyamide used in preparing the blends was a general purpose nylon 6:6 sold under the trade name Vydyne 21X by Monsanto Chemical Co. This polyamide alone has the properties set forth at the bottom of Table I. About 90 parts of the above polyetherimide were mixed with about 10 parts of the polyamide. The mixture of the two polymers was then extruded in a Werner & Pfeiderer extruder having a temperature profile varying from about 226° to 326° C. and a die temperature of about 316° C. The resulting extrudate was comminuted into pellets and the pellets injection molded into test specimens in a Battenfield molding machine at a temperature of about 265° C. to 321° C.

The impact strength of these specimens were measured according to the unnotched and notched Izod impact test and the results are set forth in the following Table 1. The heat distortion temperature, flexural properties, tensile properties and appearance of the blend were also determined and are given in Table I.

The above procedure for preparing the blend was then repeated to produce test specimens of three additional blends having varying amounts of polyetherimide relative to the polyamide. The results of the unnotched and notched Izod impact test, as well as the heat distortion temperature, flexural properties, tensile properties and appearance for these blends are also detailed in Table I.

Figure 3:
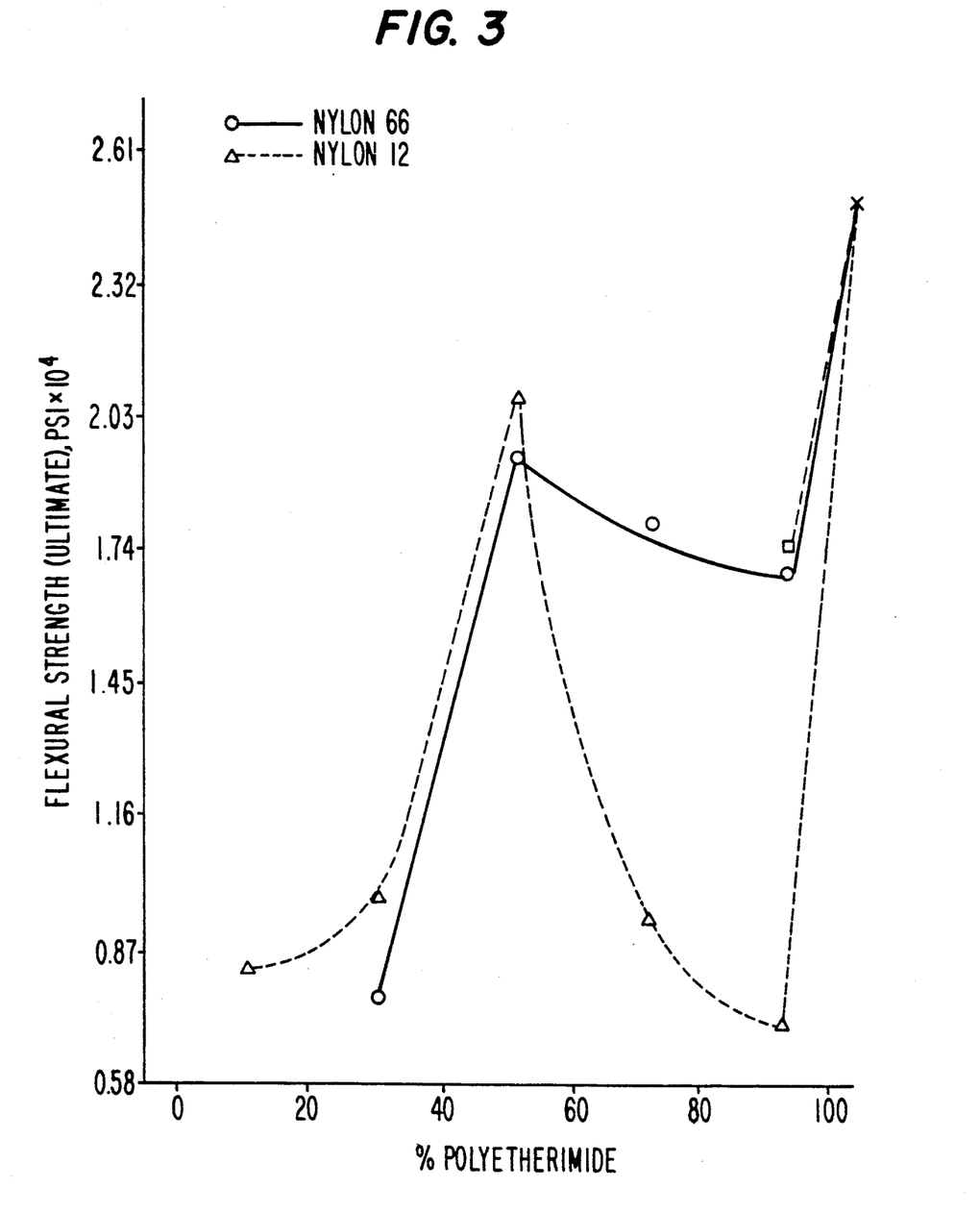
FIG. 3 is a plot of ultimate flexural strength versus polyetherimide content for blends of a polyetherimide and a polyamide.
Figure 4:
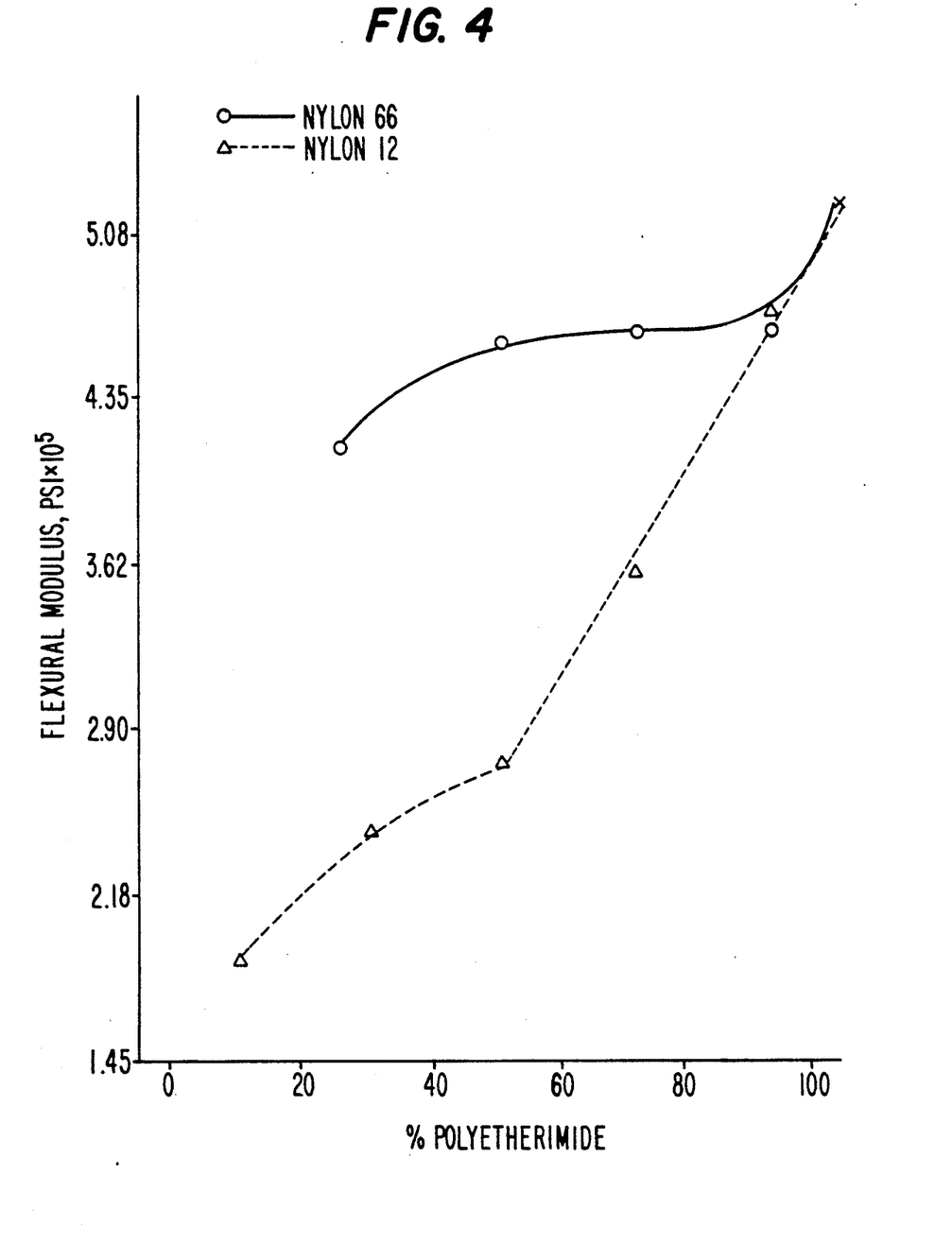
FIG. 4 is a plot of flexural modulus versus polyetherimide concentration for blends of a polyetherimide and a polyamide.

50:50 blend ratio as is shown in FIG. 3. In FIG. 4, the flexural modulus can be seen to decrease as nylon is initially added, then level out, and decrease again as the concentration of polyetherimide in the blends if reduced below about 50%.

Figure 5:
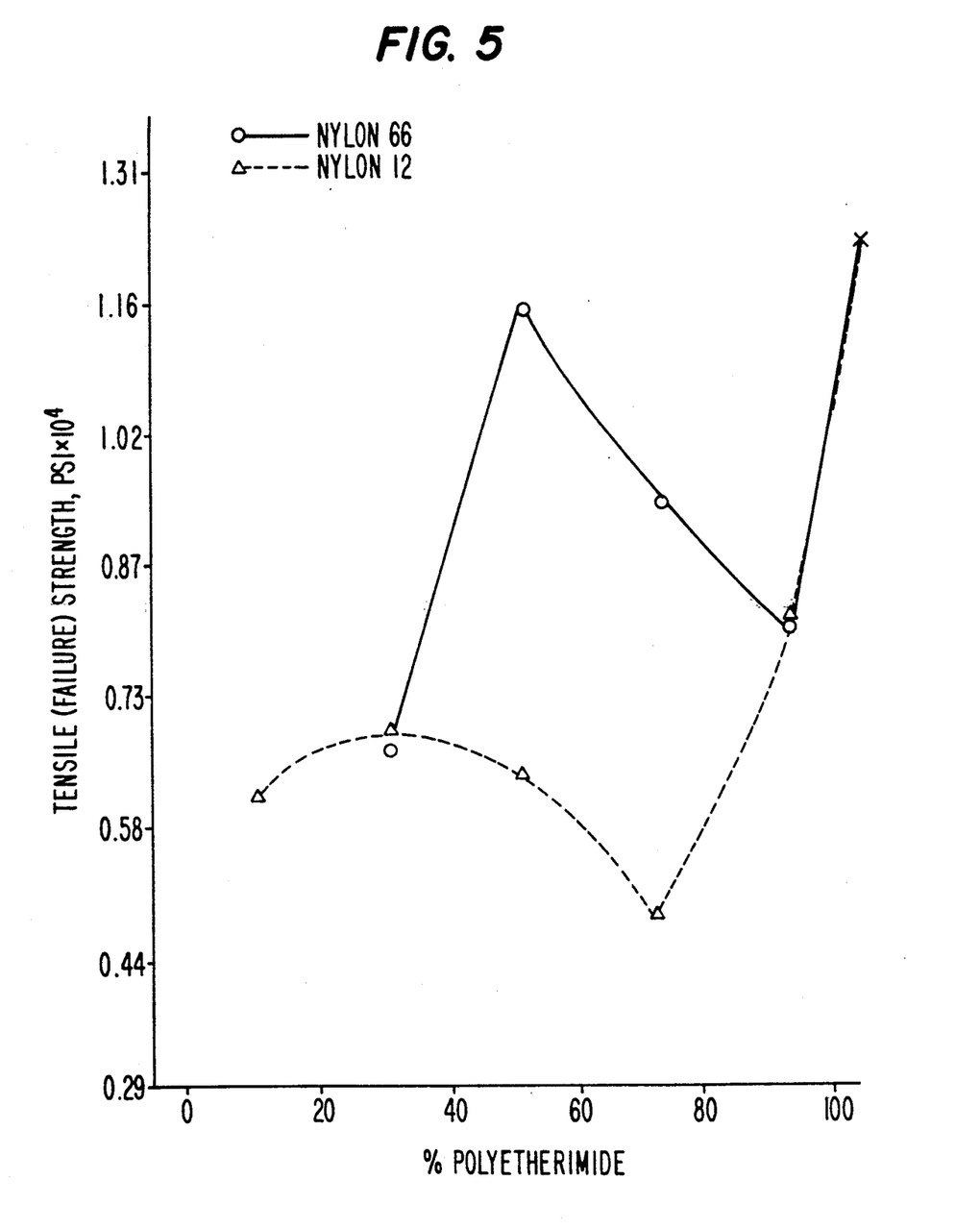
FIG. 5 is a plot of tensile strength versus polyetherimide concentration for blends of a polyetherimide and a polyamide.

From FIG. 5, the plot shows that the tensile failure strength decreases substantially at the 10% nylon blend level from the pure polyetherimide level but then the strength increases to a maximum at about the 50:50 blend level where it is only about 6% lower than the tensile failure strength of the pure polyetherimide. The substantial lowering of the tensile strength in the 90% polyetherimide blend may be due to the presence of a two phase system.

TABLE I

| Nylon Content (%) | Izod Impact, 3.2 mm bar (ft lbs/in)[1] | | HDT °C. @ 182 MPa[2] | Flexural Properties[3] | | |
|---|---|---|---|---|---|---|
| | | | | Initial Modulus (PSI × 10)[5] | Strength @ 6.2 mm Defl. (PSI × 10)[4] | Ultimate Strength (PSI × 10)[4] |
| | Notched | Unnotched | | | | |
| 0 | 1.1 | 26.5 | 186 | 5.02 | 2.10 | 173 (2.51) |
| 10 | 1.1 | 4.8 | 176 | 4.66 | 1.54 | 1.70 |
| 30 | 0.4 | 4.6 | 172 | 4.66 | — | 1.80 |
| 50 | 0.3 | 4.9 | 139 | 4.63 | 1.78 | 1.94 |
| 70 | 0.4 | 3.5 | 140 | 4.16 | 0.648 | 0.768 |
| 100[5] | 1.0 | — | 74 | 1.34 | 0.8 | |

| Nylon Content (%) | Tensile Properties[4] | | | | Appearance - Surface |
|---|---|---|---|---|---|
| | Yield | | Failure | | |
| | % | (PSI × 10)[4] | % | (PSI × 10)[4] | |
| 0 | 18 | 103 (1.50) | 36 | 1.23 | Transparent - amber |
| 10 | — | — | 6 | 0.802 | Opaque - two phase |
| 30 | — | — | 8 | 0.940 | Opaque - one-two phase - light color |
| 50 | — | — | 10 | 1.16 | Opaque - cream color - some splay |
| 70 | — | — | 5 | 0.665 | Opaque - darker color than previous one phase |
| 100[5] | | | 300 | 1.14 | |

[1]Tested according to ASTM method D-256; unnotched bar is notched on back side.
[2]Tested according to ASTM method D-648 using a 3.2 mm bar.
[3]Tested according to ASTM method D-790 using a 3.2 mm bar at a cross head speed of 1.27 mm/min.
[4]Tested according to ASTM method D-638 using a Type 1 bar with a 5.08 mm/min crosshead speed.
[5]From published data.

In FIGS. 1–5, some of the data from Table I is plotted versus relative concentration of the components of the blends in solid lines. From FIG. 1, a plot of the unnotched Izod impact strength versus polyetherimide concentration, it can be observed that small amounts of nylon result in significantly lower unnotched impact strength values. However, after this initial drop, the impact values remain relatively constant to the 50:50 blend level before another small decrease is observed. The notched Izod impact strength values are somewhat similar to the unnotched values. The notched impact strength of the blends decreased from pure polyetherimide to the 70% polyetherimide blend level and then remains fairly constant regardless of the blend ratio. From FIG. 2, it is apparent that the heat distortion temperature values decrease only slightly from 100% polyethermide to 70% concentrations of polyetherimide, but beyond this point the heat distortion temperature drops about 30° C. to 140° C. where it remains generally constant over the remainder of the blend compositions tested.

The flexural properties are plotted in FIGS. 3 and 4. The flexural strength decreases very rapidly from the 100% polyetherimide to 90% blend level and then increases slightly to a maximum occurring at about a From the above discussion, it can be observed that several of the measured properties of the blends reach a maximum relative to other blends of the total concentration range at the 50:50 blend level of polyetherimide to polyamide. Consequently, the concentration range about the 50:50 blend level, i.e., from about 40 to about 60% polyetherimide is presently preferred for the blends of the invention.

EXAMPLE II

The basic procedure of Example I was repeated using a nylon 12 sold under the tradename L-2101 by Huls instead of nylon 6:6. This polyamide alone has the properties set forth at the bottom of Table II. In addition, the extruder temperature profile varied from about 320° to 326° C. for the blends containing 10 and 30% polyetherimide and from about 315° to 332° C. for the remainder of the blends. The die temperature used in preparing all the blends was about 321° C.

As in Example I, test specimens of each blend were tested for notched and unnotched Izod impact strength as well as for heat distortion temperature, flexural properties and tensile properties. These results and the visual appearance of the various blends are set forth in Table II.

TABLE II

| Nylon Content (%) | Izod Impact, 3.2 mm bar (ft lbs/in)[1] | | HDT °C. @ 182 MPa[2] | Flexural Properties[3] | | |
|---|---|---|---|---|---|---|
| | Notched | Unnotched | | Initial Modulus (PSI × 10)[5] | Strength @ 6.2 mm Defl. (PSI × 10)[4] | Ultimate Strength (PSI × 10)[4] |
| 0 | 1.1 | 26.5 | 186 | 5.02 | 2.10 | 2.51 |
| 10 | 1.1 | 3.5 | 154 | 4.76 | 0.694 | 0.715 |
| 30 | 0.6 | 1.3 | 117 | 3.59 | — | 0.937 |
| 50 | 0.3 | 4.3 | 58 | 2.75 | 1.87 | 2.08 |
| 70 | 0.3 | 9.7 | 54 | 2.47 | 0.871 | 0.983 |
| 90 | 0.4 | 7.4 | 44 | 1.87 | 0.715 | 0.831 |
| 100[5] | 1.0 | — | 52 | 1.37 | | |

| Nylon Content (%) | Tensile Properties[4] | | | | Appearance - Surface |
|---|---|---|---|---|---|
| | Yield | | Failure | | |
| | % | (PSI × 10)[4] | % | (PSI × 10)[4] | |
| 0 | 18 | 1.50 | 36 | 1.23 | Transparent - amber |
| 10 | — | — | 6 | 0.808 | Opaque - borderline two phase |
| 30 | — | — | 4 | 0.480 | Opaque - dark cream color, uniform |
| 50 | — | — | 7 | 0.639 | Opaque - uniform cream color |
| 70 | — | — | 31 | 0.687 | Opaque - uniform light cream color |
| 90 | — | — | 11 | 0.620 | |
| 100[5] | | | | | |

[1]Tested according to ASTM method D-256: unnotched bar is notched on back side.
[2]Tested according to ASTM method D-648 using a 3.2 mm bar.
[3]Tested according to ASTM method D-790 using a 3.2 mm bar at a cross head speed of 1.27 mm/min.
[4]Tested according to ASTM method D-638 using a Type 1 bar with a 5.08 mm/min crosshead speed.
[5]From published data.

The data from Table II is also plotted in dotted lines in FIGS. 1 through 5 versus relative concentrations of the components of the blends. From FIG. 1, a plot of unnotched impact strength values versus polyetherimide concentration, it is evident that the unnotched impact decrease from pure polyetherimide (26.5 ft-lb/in) to the blend containing 70% polyetherimide content where the values start to increase and finally exhibit maximum at approximately 30% polyetherimide. In a similar manner, the notched Izod impact strength values of the blends decrease very rapidly between 90% and 50% polyetherimide content and then remain fairly constant as the concentration of nylon increases further.

Figure 1:
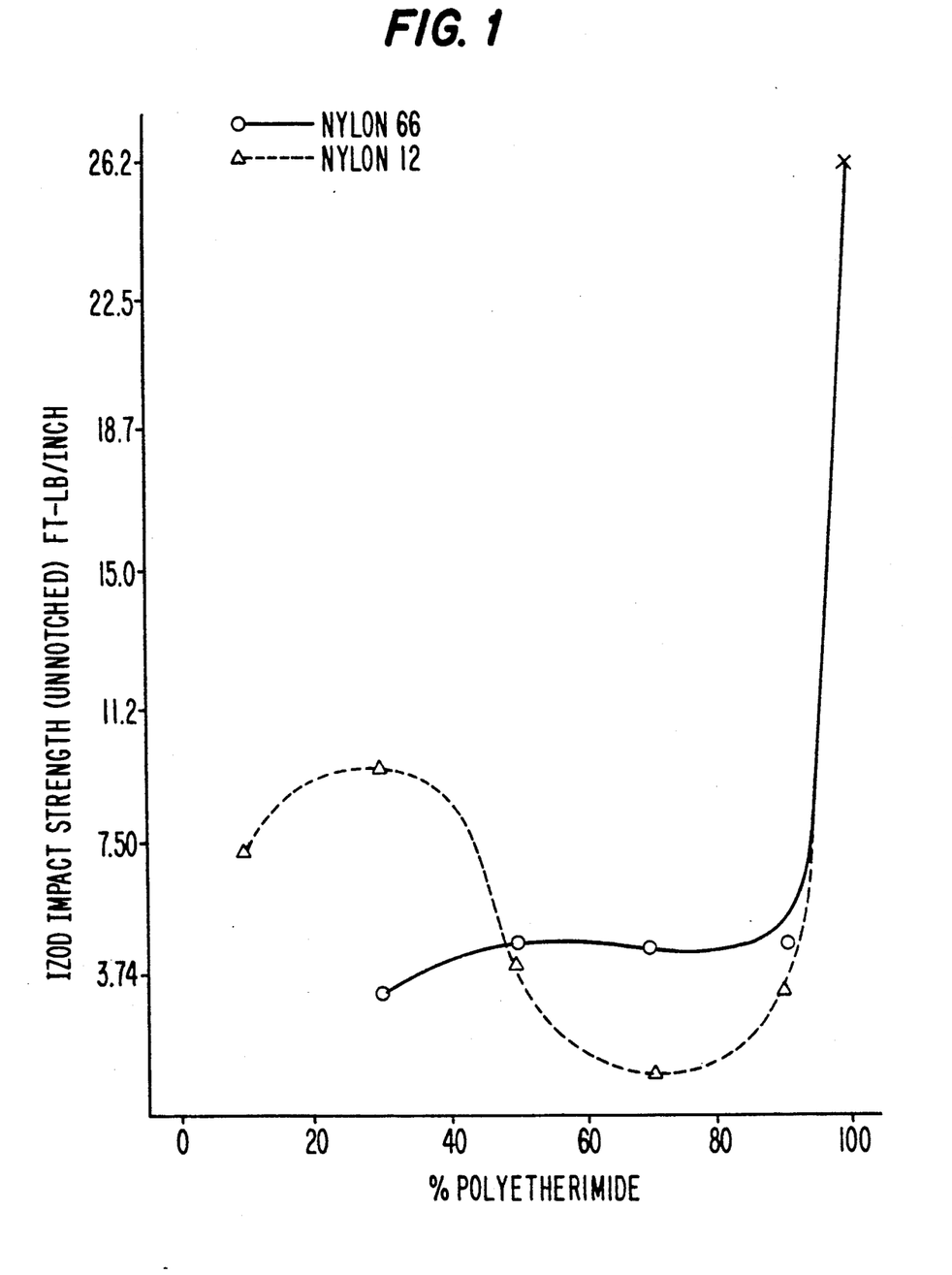
FIG. 1 is a plot of unnotched impact strength versus polyetherimide content for blends of a polyetherimide and a polyamide.
Figure 2:
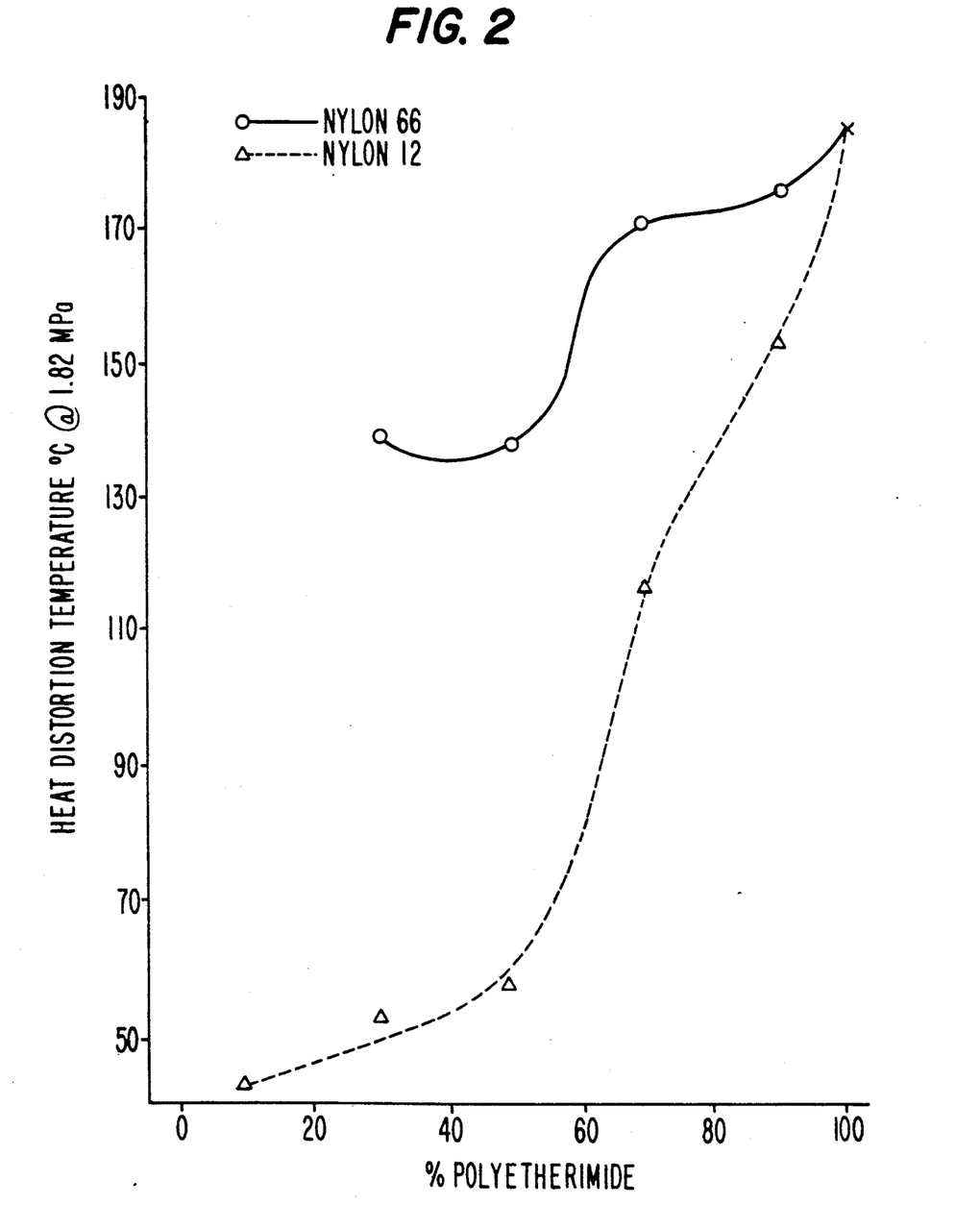
FIG. 2 is a plot of heat distortion temperature versus polyetherimide content for blends of a polyetherimide and a polyamide.

The heat distortion temperature values, plotted in FIG. 2, decrease rapidly from pure polyetherimide to the 50:50 bend level. Below 50% polyetherimide the heat distortion temperature values decrease only slightly as more nylon is included in the blends. This data suggest a phase inversion occurs around a 50:50 blend composition of the two components.

The flexural strength, plotted in FIG. 3, exhibits behavior similar to the unnotched Izod values where the values decrease as the polyetherimide concentration is lowered to the 90% level and then increase to a maximum at approximately a 50:50 blend ratio. The flexural modulus does not exhibit this same behavior but at the 50:50 blend ratio the curve does change slope as is shown in FIG. 4.

The curve formed by the tensile failure strength in FIG. 5 is very similar to both the flexural strength and Izod curves. A maximum in the tensile failure strength is found at about a 30% polyetherimide composition while the tensile failure elongation reaches its highest value at 31%. No tensile yield points are exhibited by any of these blends.

It is contemplated that substitution of other polyetherimides and/or other polyamides for the polyetherimide and/or polyamides in the blends of the above examples may result in the formulation of polymer blends having similar characteristics.

While the present invention has been described with reference to particular embodiments thereof, it will be understood that numerous modifications may be made by those skilled in the art without actually departing from the spirit and scope of the invention as defined in the appended claims.

We claim:

1. A composition comprising a blend of (a) a polyetherimide and (b) a polyamide, wherein the polyetherimide is present in a flexural strength-increasing concentration of from about 40% to about 70% of the blend by weight and the polyetherimide has the formula wherein a represents a whole number in excess of 1, the group —O—A< is selected from:

wherein R' is hydrogen, lower alkyl or lower alkoxy, Z is a member selected from the group consisting of (1)

and (2) divalent organic radicals of the general formula:

wherein X is a member selected from the group consisting of wherein q is 0 or 1, y is a whole number from 1 to 5, and R is a divalent organic radical selected from the group consisting of (1) aromatic hydrocarbon radicals having from 6-20 carbon atoms and halogenated derivatives thereof, (2) alkylene radicals and cycloalkylene radicals having from 2-10 carbon atoms, and C$_{(2-8)}$ alkylene terminated polydiorganosiloxane, and (3) divalent radicals included by the formula wherein Q is a member selected from the group consisting of wherein x is a whole number from 1 to 5 inclusive; and wherein the polyamide is selected from the group consisting of polyhexamethylene adipamide, polypyrrolidone, polycaprolactam, polyheptolactam, polycapryllactam, polynonanolactam, polyundecanolactam, polydodecanolactam, polyhexamethylene azelaiamide, polyhexamethylene sebacamide, polyhexamethylene isophthalamide, polymetaxylylene adipamide, polyamide of hexamethylenediamine and n-dodecanedioic acid, polyamide of dodecamethylenediamine and n-dodecanedioic acid, hexamethylene adipamide/caprolactam copolymer, hexamethylene adipamide/hexamethylene-isophthalamide copolymer, hexamethylene adipamide/hexamethyleneterephthalamide copolymer, trimethylhexamethylene oxamide/hexamethylene oxamide copolymer, hexamethylene adipamide/hexamethylene-azelaiamide copolymer, hexamethylene adipamide/hexamethyleneazelaiamide/caprolactam copolymer and the reaction product of dimethyl ester of terephthalic acid and a mixture of isomeric trimethylhexamethylenediamine.

2. A composition in accordance with claim 1 wherein the polyetherimide is of the formula:

and the divalent bonds of the —O—Z—O— radical being in the 3,3'; 3,4'; 4,3' or the 4,4' position and comprises from about 40% to about 60% of the blend by weight.

3. A composition in accordance with claim 2 wherein Z is;

and R is selected from:

4. A composition in accordance with claim 3 wherein the polyetherimide is of the formula:

5. A composition in accordance with claim 1 wherein the polyamide is nylon 66.

6. A composition in accordance with claim 1 wherein the polyamide is nylon 12.

* * * * *